United States Patent [19]

Konishi

[11] Patent Number: 4,671,608

[45] Date of Patent: Jun. 9, 1987

[54] OPTICAL COUPLING UNIT

[75] Inventor: Kuniyoshi Konishi, Tokyo, Japan

[73] Assignee: Kabushiki Kaisha Toshiba, Kawasaki, Japan

[21] Appl. No.: 675,399

[22] Filed: Nov. 27, 1984

[30] Foreign Application Priority Data

Nov. 29, 1983 [JP] Japan ................................. 58-224922

[51] Int. Cl.$^4$ ............................................... G02B 6/28
[52] U.S. Cl. .................................................. 350/96.16
[58] Field of Search .......................... 350/96.16, 96.15; 455/606, 607, 612, 617

[56] References Cited

U.S. PATENT DOCUMENTS 4,063,220 12/1977 Metcalfe et al. ............. 340/147 LP
4,252,402 2/1981 Puech et al. ..................... 350/96.14

Primary Examiner—Robert E. Wise
Attorney, Agent, or Firm—Cushman, Darby & Cushman

[57] ABSTRACT

An optical coupling unit connected to a single optical fiber includes first to fourth directional couplers each having three terminals. The optical coupling unit receives at a first side a first optical signal transmitted in a first direction through the fiber, and at a second side a second optical signal transmitted in a second direction through the fiber. The first optical signal is guided to the second side through first and second couplers and is guided through the first and third couplers to a first optical receiver. The second optical signal is guided to the first side through the second and first couplers and is guided to a second optical receiver through the second and fourth couplers. When an optical signal input to the second optical receiver is below a predetermined level, a first optical transmitter produces an optical signal formed by O-ring a second electrical signal from the second optical receiver and a transmission signal. The optical signal from the first optical transmitter is guided to the first side through the third and first couplers. When an optical signal input to the first optical receiver is below a predetermined level, an optical signal corresponding to the signal formed by ORing the first electrical signal from the first optical receiver and the transmission signal is output from a second optical transmitter and is guided through the fourth and second couplers to the second side. The signal obtained by ORing the first and second electrical signals is used as reception signal.

3 Claims, 5 Drawing Figures

OPTICAL COUPLING UNIT

BACKGROUND OF THE INVENTION

This invention relates to an optical coupling unit applied to a bidirectional optical broadcast network using optical fibers.

By convention, the optical broadcast network is constructed by using the optical star coupler, as described in, for example, the catalogue (FIGS. 1 and 2) on Codent (trademark) issued by CODENOLL Technology Corporation, in September, 1982. This type of network is interconnected by extending one of the input side fibers of the optical star coupler and one of the output side fibers to each node. In this optical broadcast network, data from each node is transmitted through the optical star coupler to all other nodes. Each node can receive all of the data transmitted from all of the other nodes. Thus, this network is equivalent to a broadcast network (called an electrical broadcast network) using a coaxial cable called a serial bus. The optical broadcast network, unlike the electrical broadcast network, however, is unable to transmit data bidirectionally. To obtain bidirectional data transmission, the conventional optical broadcast network using the optical star coupler requires a number of optical fibers. One of the marketed electrical broadcast networks is ETHERNET (trademark of Xerox Co.).

The optical star coupler is fabricated by putting several optical fibers in a group. This group of fibers is heated, stretched, twisted and fused together, forming an optical mixer. This configuration divides the fibers into two groups. For fabricating the optical star coupler, an extremely elaborate technique is required, as is well known. Therefore, it is very difficult to fabricate an optical star coupler having many input/output ports (the number of branches). In this respect, it is very difficult to realize a large-scale optical broadcast network. Furthermore, in this type of network, the optical star coupler must be installed at a fixed location. This fixed installing location and the limitations on the number of branches make it difficult to modify and expand the optical system.

SUMMARY OF THE INVENTION

Accordingly, an object of the present invention is to provide an optical coupling unit which can achieve broadcasting through the optical fiber without using the optical star coupler.

Another object of the present invention is to provide an optical coupling unit which can realize a bidirectional broadcast network.

Another object of the present invention is to provide an optical coupling unit which can be set at any location along the optical fiber such that a bidirectional broadcast network can be constructed with greater diversity of the system's architecture.

According to the present invention, an optical coupling unit coupled with a single optical fiber cable is provided through which first and second optical signals are transmitted in opposite directions. The optical coupling unit is provided with first to fourth directional couplers. The first directional coupler includes a first port for receiving a first optical signal, a second port for receiving a third optical signal, and a third port for receiving a fourth optical signal. The second directional coupler includes a fourth port for receiving a second optical signal, a fifth port for receiving a fifth optical signal output from the second port of the first directional coupler, and a sixth port for receiving an eighth optical signal. In the first directional coupler, a first optical signal input to the first port is guided as the fifth optical signal to the second port and as a sixth optical signal to the third port. In the first directional coupler, the third optical signal input to the second port and the fourth optical signal input to the third port are coupled with each other. The coupled signal is guided as a seventh optical signal to the first port. In the second directional coupler, the second optical signal input to the fourth port is guided as the third optical signal to the fifth port and as a ninth optical signal to the sixth port. In the second directional coupler, the fifth optical signal input to the fifth port and the eighth optical signal input to the sixth port are coupled with each other. The coupled signal is guided as a tenth signal to the fourth port.

The third directional coupler is provided with a seventh port, an eighth port for receiving the sixth optical signal output from the third port of the first directional coupler, and a ninth port for receiving an eleventh optical signal for transmission. The fourth directional coupler is provided with a tenth port, an eleventh port for receiving the ninth optical signal output from the sixth port of the second directional coupler, and a twelfth port for receiving a thirteenth optical signal for transmission. In the third directional coupler, the sixth optical signal input to the eighth port is guided as a twelfth optical signal for reception, and the eleventh optical signal input to the ninth port is guided as the third optical signal to the eighth port. In the 4th directional coupler, the ninth optical signal input to the eleventh port is guided as a fourteenth optical signal for reception, and the thirteenth optical signal input to the twelfth port is guided as the eighth optical signal.

DETAILED DESCRIPTION OF THE PREFERRED EMBODIMENT

Figure 1:
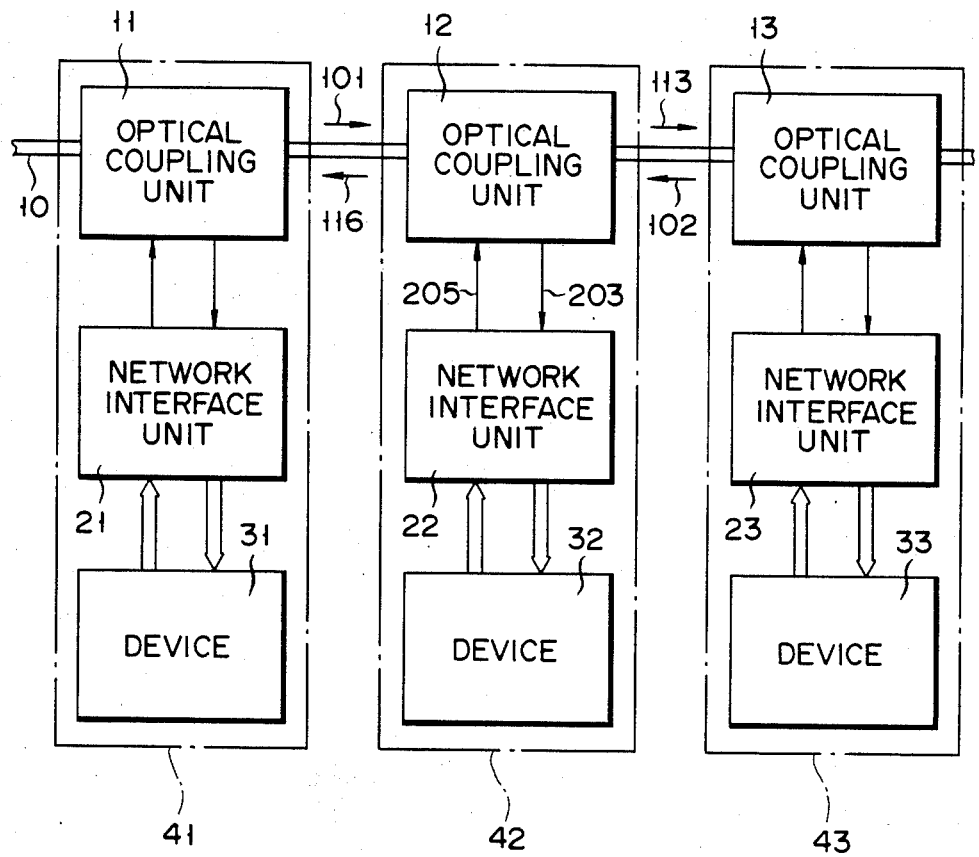
FIG. 1 shows a block diagram of an embodiment of a bidirectional optical broadcast network to which an optical coupling unit according to the present invention is applied.

Reference is made to FIG. 1 illustrating an embodiment of a bidirectional optical broadcast network to which an optical coupling unit according to the present invention is applied. As shown in FIG. 1, three optical coupling units 11–13 are interconnected with one another by a single optical fiber cable 10. The optical fiber cable 10 is used as a communication medium like a coaxial cable in the electrical broadcast system. The optical coupling units 11–13 are connected to the network interface units 21–23, respectively. The network interface units 21–23 are each provided with a scrambler, a descrambler, a collision detector, a receiver logic, an error detector, and a serial/parallel converter. For simplicity, those components of each unit are not illustrated. The network interface units 21–23 are respectively connected to devices 31–33 such as computers and terminal equipment. The device 31, the network interface unit 21 and the optical coupling unit 11 cooperate to form a communicating station 41. The device 32, the network interface unit 22 and the optical coupling unit 12 likewise form a communicating station 42. The device 33, the network interface unit 23 and the optical coupling unit 13 form a communicating station 43. As described above, a bus type network interconnects the three communicating stations 41–43 with one another by the optical fiber cable 10.

Figure 2:
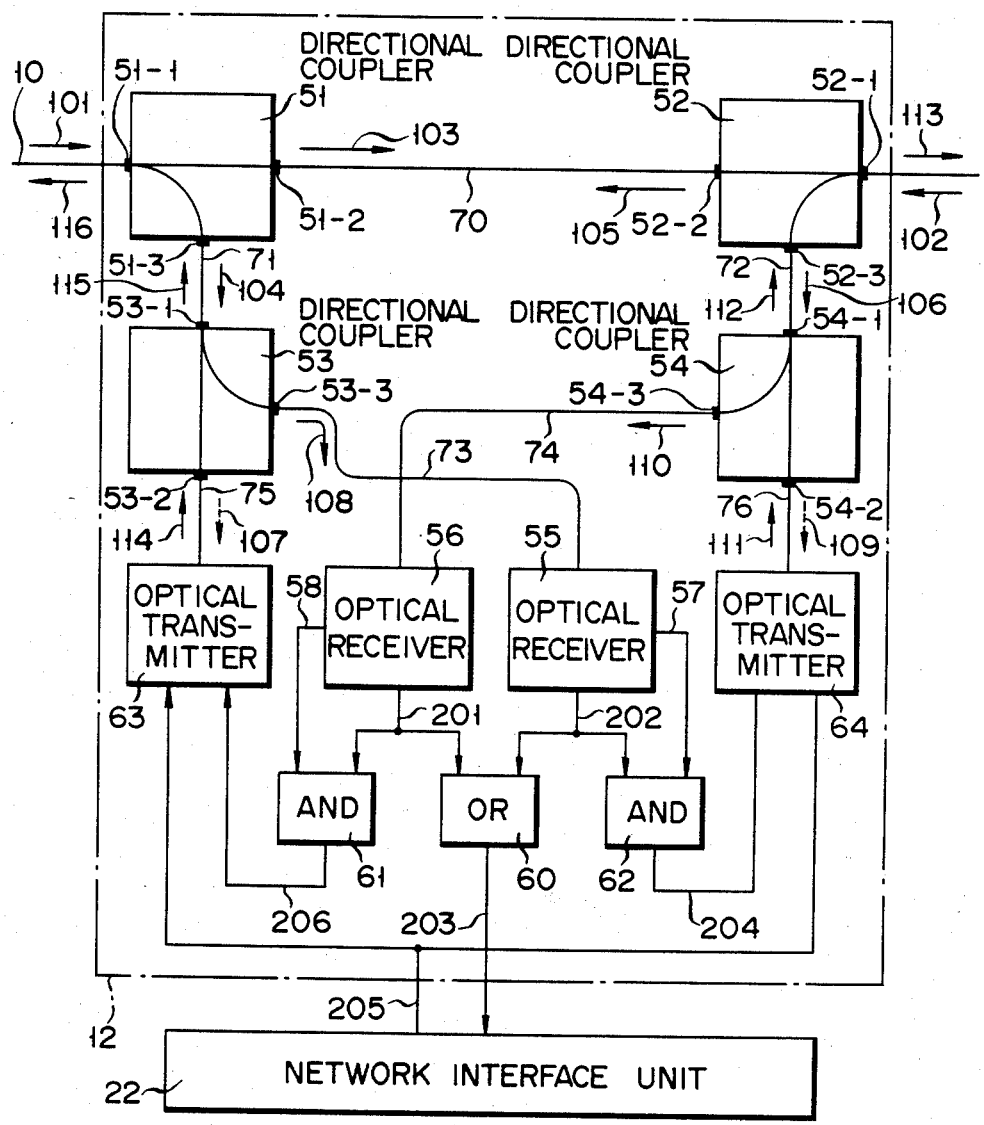
FIG. 2 is a block diagram of the optical coupling unit shown in FIG. 1.

FIG. 2 shows a configuration of the optical coupling unit 12. As shown in FIG. 2, the optical coupling unit 12 contains directional couplers 51–54. The directional couplers 51–54 are provided with input/output terminals 51-1 to 51-3, and the directional coupler 52 includes input/output terminals 52-1–52-3. The directional coupler 53 includes input/output terminals 53-1 to 53-3, and the directional coupler 54 includes input/output terminals 54-1 to 54-3. Each of the directional couplers 51–54 are each made of OD-8601, manufactured by NEC (Japan).

Light entering the input/output terminal 51-1 of the directional coupler 51 is equally split into two portions and output from the input/output terminals 51-2 and 51-3. Light entering the input/output terminals 51-2 and 51-3 of the directional coupler 51 are coupled together in the directional coupler 51 and output through the input/output terminal 51-1. This is true for the remaining directional couplers 52–54. Therefore, in the description of the directional coupler 51, reference numeral 51 may be replaced by reference numeral 52, 53 or 54. In addition, the basic configuration of each of the optical coupling units 11 and 13 is the same as that of the optical coupling unit 12 shown in FIG. 2. For this reason, the configurations of the optical coupling units 11 and 13 are not illustrated.

The optical fiber cable 10 is connected to the input/output terminal 51-1 of the directional coupler 51, and the input/output terminal 52-1 of the directional coupler 52. The input/output terminal 51-2 of the directional coupler 51 and the input/output terminal 52-2 of the directional coupler 52 are interconnected by an optical fiber 70. The input/output terminal 51-3 of the directional coupler 51 and the input/output terminal 53-1 of the directional coupler 53 are interconnected by an optical fiber 71. The input/output terminal 52-3 of the directional coupler 52 and the input/output terminal 54-1 of the directional coupler 54 are interconnected by an optical fiber 72.

Figure 3:
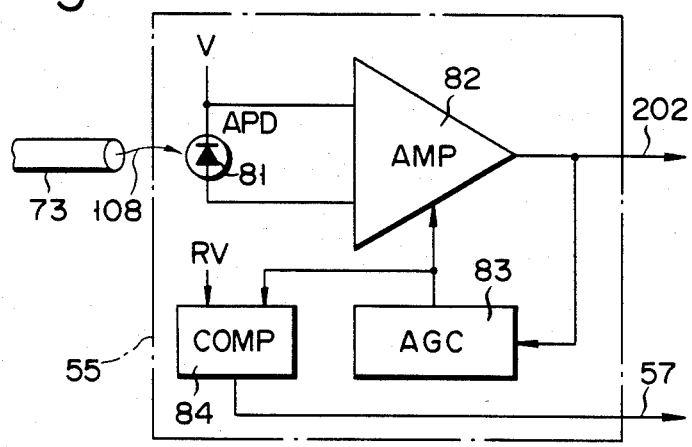
FIG. 3 is a block diagram of an optical receiver shown in FIG. 2.

The input/output terminal 53-3 of the directional coupler 53 is connected to the input terminal of an optical receiver 55 through an optical fiber 73. The input/output terminal 54-3 of the directional coupler 54 is connected to the input terminal of an optical receiver 56 through an optical fiber 74. The optical receiver 55 is a known circuit for converting an optical signal into an electrical signal at a predetermined level, which includes an avalanche photo diode (APD) 81, an amplifier (AMP) 82, an AGC (automatic gain control) 83, and the like, as shown in FIG. 3. The optical receiver 55 also contains a comparator (COMP) 84. The comparator 84 compares an AGC voltage from the AGC (automatic gain control) 83 with a reference voltage RV, and provides a signal 57. The basic configuration of the optical receiver 56 is the same as that of the optical receiver 55 shown in FIG. 3. Therefore, the configuration of the optical receiver 56 is not illustrated. Note here that a comparator (not shown) in the optical receiver 56 provides a signal 58.

The output of the optical receiver 55 is connected to one of the input terminals of a two-input OR gate 60, and the output of the optical receiver 56 is input to the other input of the OR gate 60. The output of the OR gate 60 is connected to the input of the network interface unit 22. The output of the optical receiver 56 is also connected to one of the inputs of a two-input AND gate 61, and the signal 58 from the optical receiver 56 is connected to the other input of the AND gate 61. The AND gate 61 is enabled by the signal 58. The output of the optical receiver 55 is also connected to one of the inputs of a two-input AND gate 62. The signal 57 from the optical receiver 55 is connected to the other input of the AND gate 62. The AND gate 62 is enabled by the signal 57. The output signal of the AND gate 61 is connected to one of the two inputs of an optical transmitter 63, and the output of the AND gate 62 is connected to one of the two inputs of an optical transmitter 64. The output of the network interface unit 22 is connected to the other inputs of the optical transmitters 63 and 64.

Figure 4:
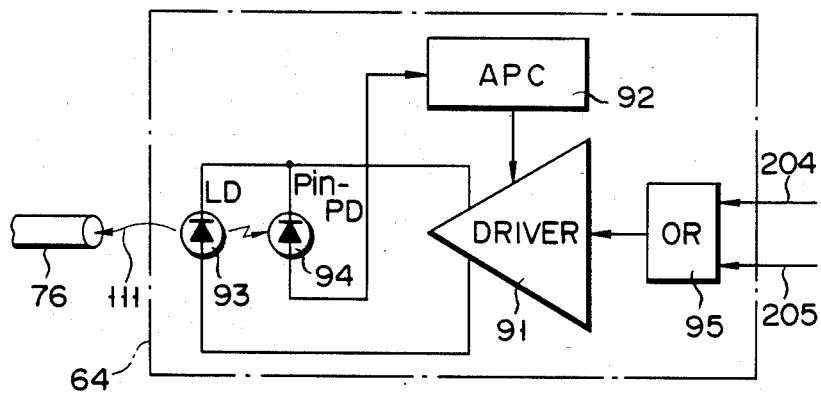
FIG. 4 is a block diagram of an optical transmitter shown in FIG. 2.

The optical transmitter 64, a known circuit for converting an electrical signal for transmission into an optical signal at a predetermined level (intensity), is made up of a driver 91, an APC (automatic power control) 92, a laser diode (LD) 93, and a pin photo diode (pin-PD) 94, as shown in FIG. 4. The optical transmitter 64 also has a two-input OR gate 95. The OR gate 95 is connected at one input to one input of the optical transmitter 64 and at the other input to the other input of the optical transmitter 64. The output of the OR gate 95 is connected to the input of the driver 91. The basic configuration of the optical transmitter 63 is the same as that of the optical transmitter 64 shown in FIG. 4. Therefore, the configuration of the optical transmitter 63 is not illustrated.

The broadcast network shown in FIG. 1 is capable of transmitting data bidirectionally. A description of the bidirectional transmission follows. As shown in FIGS. 1 and 2, the optical coupling unit 12 receives at the left side an optical signal 101 and at the right side an optical signal 102. The signal 101 is input into the input/output terminal 51-1 of the directional coupler 51 in the optical coupling unit 12 through an optical fiber cable 10. The optical signal 101 input to the input/output terminal 51-1 is equally divided into two signals which are in turn directed to the input/output terminals 51-2 and 51-3. The optical signal from the terminal 51-2 is output as an optical signal 103 on the optical fiber 71. The optical signal output from the terminal 51-3 is output as an optical signal 104 on the optical fiber 71. The optical signal 102 is input through the optical fiber cable 10 to the input/output terminal 52-1 of the directional coupler 52 in the optical coupling unit 12. The optical signal 102 input to the input/output terminal 52-1 is equally split into two optical signals which are guided to the input/output terminals 52-2 and 52-3, respectively. The terminal 52-2 outputs an optical signal 105 for transmission on the optical fiber 70. The terminal 52-3 outputs an optical signal 106 on the optical fiber 72.

The optical signal 104 output from the terminal 51-3 of the directional coupler 51 is input through the optical fiber 71 to the input/output terminal 53-1 of the directional coupler 53. The optical signal 104 input to the input/output terminal 53-1 is equally divided into two optical signals for the input/output terminals 53-2 and 53-3. The terminal 53-2 outputs an optical signal 107 on optical fiber 75. The terminal 53-2 outputs optical signal 108 on the optical fiber 73. The optical signal 106 output from the input/output terminal 52-3 of the directional coupler 52 is input to the input/output terminal 54-1 of the directional coupler 54, via the optical fiber 72. The optical signal 106 input to the input/output terminal 54-1 is equally divided into two optical signals for the input/output terminal 54-2 and 54-3. The terminal 54-2 outputs an optical signal 109 on the optical fiber 76. The terminal 54-3 outputs an optical signal 110 on the optical fiber 74. The input/output terminal 54-2 of the directional coupler 54 is connected to the output of the optical transmitter 64, through the optical fiber 76, as described above. Therefore, the optical signal 109 from the input/output terminal 54-2 little affects the optical transmitter 64. The input/output terminal 53-2 of the directional coupler 53 is connected to the output of the optical transmitter 63 through the optical fiber 75. Therefore, the optical signal 107 from the input/output terminal 53-2 little affects the optical transmitter 63.

The optical signal 108 output from the input/output terminal 53-3 of the directional coupler 53 is input to the optical receiver 55 by way of the optical fiber 73. The optical receiver 55 converts the optical signal 108 into an electrical signal 202 at a predetermined level. In the optical receiver 55, the comparator (COMP) 84 compares the AGC voltage from the AGC (automatic gain control) 83 with the reference voltage RV. The comparator (COMP) 84 produces signal 57 of logical 1 when the AGC voltage is above the reference voltage RV. When it is below the reference voltage RV, the comparator (COMP) 84 produces a signal 57 of logical 0. The AGC voltage corresponds to a signal level (intensity) of the optical signal 108. Thus, the signal 57 indicates whether the optical signal 108 is above or below the predetermined level. (the reference voltage RV will be given in detail later). The optical signal 110 output from the input/output terminal 54-3 of the directional coupler 54 passes through the optical fiber 74 to enter the optical receiver 56. The optical receiver 56 converts the optical signal 110 into an electrical signal 201 at a predetermined level and further produces a signal 58 indicating whether or not the optical signal 110 is below the predetermined level.

The electrical signal 202 output from the optical receiver 55 and the electrical signal 201 from the optical receiver 56 are supplied to the OR gate 60. The OR gate 60 ORs the electrical signals 201 and 202 and produces a reception signal 203. The reception signal 203 is supplied to the network interface unit 22. With this reception signal 203, the unit 22 can detect a collision of the signals and reproduce the received data. Thus, this embodiment can receive the optical signals 101 and 102 transmitted in opposite directions.

The electrical signal 201 output from the optical receiver 56, together with the signal 58 from the optical receiver 56, is also supplied to the AND gate 61. The electrical signal 202 output from the optical receiver 55, together with the signal 57 from the optical receiver 55, is supplied to the AND gate 62. The AND gate 62 allows the electrical signal 202 from the optical receiver 55 to pass therethrough only during the period when the signal 57 from the optical receiver 55 is logical 1. The output signal 204 from the AND gate 62 is supplied to the optical transmitter 64. The signal 205 from the network interface unit 22 is also supplied to the optical transmitter 64. The signal 205 from the network interface unit 22 and the signal 204 from the AND gate 62 are ORed by an OR gate 95 in the optical transmitter 64. The optical transmitter 64 converts the ORed signal of the signals 205 and 204 into an optical signal 111 at a predetermined level. Similarly, the AND gate 61 allows the electrical signal 201 from the optical receiver 56 to pass therethrough only during the period when the signal 58 from the optical receiver 56 is logical 1. The output signal 206 from the AND gate 61 is supplied to the optical transmitter 63. The signal 205 transmitted from the network interface unit 22 is also supplied to the optical transmitter 63. The optical transmitter 64 converts the ORed signal of the signals 205 and 206 into an optical signal 114 at a predetermined level.

The optical signal 111 output from the optical transmitter 64 passes through the optical fiber 76 to the input/output terminal 54-2 of the directional coupler 54. The optical signal 111 input to the input/output terminal 54-2 of the directional coupler 54 is guided to the input/output terminal 54-1 and is output as an optical signal 112 from the terminal 54-1 on the optical fiber 72. The optical signal 112 from the input/output terminal 54-1 of the directional coupler 54 passes through the optical fiber 72 to the input/output terminal 52-3 of the directional coupler 52. The optical signal 103 from the input/output terminal 51-2 of the directional coupler 51 passes through the optical fiber 70 to enter the input/output terminal 52-2 of the directional coupler 52, as described above. The optical signal 103 input to the input/output terminal 52-2 of the directional coupler 52 and the optical signal 112 input to the input/output terminal 52-3 are both guided to the input/output terminal 52-1. The optical signals 103 and 112 are then coupled, and the coupled signal is output as an optical signal 113 from the terminal 52-1 to the optical fiber cable 10. The optical signal 113 is transmited to the optical coupling unit 13 by way of the optical fiber cable 10.

The optical signal 114 output from the optical transmitter 63 is input to the input/output terminal 53-2 of the directional coupler 53 through the optical fiber 75. The optical signal 114 input to the input/output terminal 53-2 of the directional coupler 53 is guided to the input/output terminal 53-1, and is output as an optical signal 115 from the terminal 53-1 on the optical fiber 71. The optical signal 115 from the input/output terminal 53-1 of the directional coupler passes through the optical fiber 71 to the input/output terminal 51-3 of the directional coupler 51. The optical signal 105 from the input/output terminal 52-2 of the directional coupler 52 is input through the optical fiber 70 to the input/output terminal 51-2 of the directional coupler 51. The optical signal 105 input to the input/output terminal 51-2 of the directional coupler 51 and the optical signal 115 input to the input/output terminal 51-3 are both guided to the input/output terminal 51-1 and are coupled together. The coupled signal is then transmitted as an optical signal 116 from the terminal 51-1 to the optical fiber cable 10. The optical signal 116 is transmitted through the optical fiber cable 10 to the optical coupling unit 11.

As seen from the foregoing description, the optical signal 113, which is output to the optical fiber cable 10 from the input/output terminal 52-1 of the optical coupler 52, i.e., the right side of the optical coupling unit 12, contains the optical signal 103 corresponding to the optical signal 101 input to the left side of the optical coupling unit 12. The optical signal 116, which is output from the input/output terminal 51-1 of the optical coupler 51, i.e., the left side of the optical coupling unit 12, contains the optical signal 105 corresponding to the optical signal 102 input to the right side of the optical coupling unit 12. The optical signals 113 and 116 also contain an optical signal corresponding to the signal 205 transmitted from the network interface unit 22. Thus, this embodiment can relay the optical signals which are transmitted is in opposite directions. Additionally, this embodiment can transmit the optical signals corresponding to the transmission signals bidirectionally. Further, the optical coupling unit 12 may be set at any location of the optical fiber cable 10.

Figure 5:
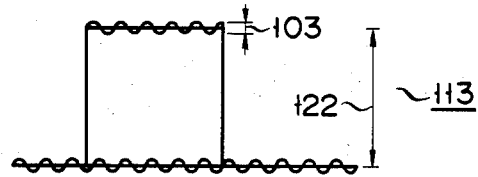
FIG. 5 shows an example of a waveform of an optical signal output from the optical coupling unit of FIG. 2.

Let us consider a case where the signal 57 output from the optical receiver 55 is logical 1, viz., a signal level of the optical signal 108 input to the optical receiver 55 is below a predetermined level. When the signal 57 is logical 1, the AND gate 62 outputs to the optical transmitter 64 the electrical signal 202 supplied from the optical receiver 55. In this case, the optical signal 111 output from the optical transmitter 64 contains the optical signal corresponding to the electrical signal 202 derived from the optical receiver 55. Accordingly, the optical signal 113 output from the input/output terminal 52-1 of the optical coupler 52 also contains the optical signal corresponding to the electrical signal 202 derived from the optical receiver 55. The electrical signal 202 from the optical receiver 55 has been amplified up to a predetermined level (exactly to a level of the signal 205 from the network interface unit 22), irrespective of the signal level of the optical signal 108 input to the optical receiver 55. Therefore, if the signal level of the optical signal 108 input to the optical receiver 55 is below a predetermined level, the optical signal 113 contains, as shown in FIG. 5, a signal 122 obtained by amplifying the optical signal 101, as well as the optical signal 103 which is substantially identical with the optical signal 101. The optical signal corresponding to the transmission signal 205 is omitted in FIG. 5.

It is assumed that the optical signal 113 contains only the optical signal 103. In this case, in order that the optical coupling unit 13 correctly gains an electrical signal corresponding to the optical signal 113 from the optical coupling unit 12, a signal level of the optical signal 113 must be larger than a level L. When the optical signal 113 does not contain the optical signal 112 from the directional coupler 54, the signal level of the optical signal 113 is substantially equal to that of the optical signal 103 from the input/output terminal 51-2 of the directional coupler 51. The signal level of the optical signal 103 is about ½ of the level of the optical signal 101 input to the input/output terminal 51-1 and is equal to that of the optical signal 104 from the input/output terminal 51-3. The signal level of the optical signal 108 input to the optical receiver 55 is about ½ of that of the optical signal 104. Accordingly, if the signal level of the optical signal 108 is L/2 or less, it is difficult for the optical coupling unit 13 to correctly obtain the electrical signal corresponding to the optical signal 113 (exactly the optical signal 103 contained therein). In this embodiment, the circuit is designed so that when the signal level of the optical signal 108 is L/2 or less, the optical signal 122 obtained by amplifying the optical signal 101 is made to be contained in the optical signal 113, as described below.

The amplifier 82 in the optical receiver 55 produces an electrical signal 202 at a predetermined level in response to the AGC voltage from the AGC (automatic gain control) 83 without regard to the signal level of the optical signal 108. The comparator (COMP) 84 in the optical receiver 55 compares the AGC voltage from the AGC 83 with the reference voltage RV, and produces a signal 57 indicating whether or not the AGC voltage is above the reference voltage RV. In this embodiment, an AGC value, when the signal level of the optical signal 108 is equal to L/2, is used for the reference voltage RV. Accordingly, the signal 57 indicates whether or not the signal level of the optical signal 108 is L/2 or less. The comparator 84 in the optical receiver 55 produces a signal of logical 1 only when the AGC voltage is above the reference voltage RV, that is, the signal level of the optical signal 108 is below L/2. When the signal 57 is logical 1, the AND gate 62 is enabled to allow the electrical signal 202 output from the optical receiver 55 to pass to the optical transmitter 64. As a result, as described above, the optical signal corresponding to the electrical signal 202, i.e., the optical signal 122 obtained by amplifying the optical signal 101, is contained in the optical signal 113 to be transmitted to the optical coupling unit 13.

As described above, according to the present embodiment, when the level of the optical signal 101 input from the left side of the optical coupling unit 12 is below a predetermined level, the optical signal 101 is amplified and transferred to the succeeding stage, i.e., the optical coupling unit 13. Because of this feature, there is no need for an expensive optical receiver with a high sensitivity dynamic range. The above description is correspondingly applied to the optical signal 102 input from the right side of the optical coupling unit 12. When seeing the signal waveform shown in FIG. 5, there is a possibility that the optical signal 103 serves as a noise component of the optical signal 113. However, the signal level of the signal 122 is satisfactorily higher than that of the signal 103, and hence, the signal 103 never adversely influences the signal-reception and -amplifying at the succeeding stage, i.e., the optical coupling unit 13 in this example.

This embodiment uses optical connectors (not shown) to connect the optical fibers to the directional couplers. If the directional couplers have optical fibers in place of the optical input/output terminals, they may be connected to external optical fibers in a splicing manner.

While the present invention has been described using a specific embodiment, it is not limited to such a specific embodiment, but may be variously changed and modified within the scope of the present invention. For example, the optical coupling unit according to the present invention is applicable for an optical broadcast network of the ring type. The comparator (COMP) 84, which is provided in the optical receiver 55 in the above embodiment, also may be provided outside of the optical receiver 55, if necessary. Further, the OR gate 95 in the optical transmitter 64 may be provided outside thereof, if necessary. Further, the directional couplers 51 to 54 with three terminals may be replaced by directional couplers with four terminals. In this case, however optical loss is increased. When the optical receiver with a high sensitivity dynamic range is used for the optical receivers 55 and 56, the circuitry of the AND gates 61 and 62 necessary for relaying the signals obtained by amplifying the optical signals 102 and 101 may be omitted. It is sufficient that the optical fiber cable 10 may be any optical passing means functionally considered as a single bidirectional optical transmission path. In this respect, the optical fiber cable 10 may be formed by connecting a plurality of optical fibers by optical connectors or in a splicing manner.

What is claimed is:

1. An optical coupling unit for bidirectional optical transmission adapted for connection to a single optical fiber cable through which first and second optical signals with opposite transmission directions are transmitted, said optical coupling unit comprising:

a first directional coupler having a first port for receiving said first optical signal, a second port for receiving a third optical signal, and a third port for receiving a fourth optical signal, said first directional coupler guiding said first optical signal, as input to said first port, as a fifth optical signal to said second port and as a sixth optical signal to said third port, and further combining said third optical signal input to said second port and said fourth optical signal input to said third port to form a seventh optical signal, and guiding said seventh optical signal to said first port;

a second directional coupler having a fourth port for receiving said second optical signal, a fifth port for receiving said fifth optical signal output from said second port of said first directional coupler, and a sixth port for receiving an eighth optical signal, said second directional coupler guiding said second optical signal, as input to said fourth port, as said third optical signal to said fifth port and as a ninth optical signal to said sixth port, and further combining said fifth optical signal input to said fifth port and said eighth optical signal input to said sixth port to form a tenth optical signal, and guiding said tenth optical signal to said fourth port;

a third directional coupler having a seventh port, an eighth port for receiving said sixth optical signal output from said third port of said first directional coupler, and a ninth port for receiving an eleventh optical signal for transmission, said third directional coupler for guiding said sixth optical signal, as input to said eighth port, as a twelfth optical signal for reception to said seventh port, and further guiding said eleventh optical signal, as input to said ninth port, as said fourth optical signal to said eighth port;

a fourth directional coupler having a tenth port, an eleventh port for receiving said ninth optical signal output from said sixth port of said second directional coupler, and a twelfth port for receiving a thirteenth optical signal for transmission, said fourth directional coupler guiding said ninth optical signal, as input to said eleventh port, as a fourteenth optical signal for reception to said tenth port, and further guiding said thirteenth optical signal, as input to said twelfth port, as said eighth optical signal to said eleventh port;

first optical receiving means for converting said twelfth optical signal output from said seventh port of said third directional coupler into a first electrical signal;

second optical receiving means for converting said fourteenth optical signal output from said tenth port of said fourth directional coupler into a second electrical signal;

a first gate circuit for providing a reception signal in response to said first electrical signal output from said first optical receiving means and said second electrical signal output from said second optical receiving means;

a second gate circuit for passing said second electrical signal output from said second optical receiving means in response to a signal level of said fourteenth optical signal received by said second optical receiving means;

a third gate circuit for passing said first electrical signal output from said first optical receiving means in response to a signal level of said twelfth optical signal received by said first optical receiving means;

first optical transmission means for converting a signal as formed by ORing a third electrical signal for transmission and said second electrical signal output from said second gate circuit into said eleventh optical signal, and outputting said eleventh optical signal to said ninth port of said third directional coupler; and second optical transmission means for converting a signal as formed by ORing said third electrical signal and said first electrical signal output from said third gate circuit into said thirteenth optical signal, and outputting said thirteenth optical signal to said twelfth port of said fourth directional coupler.

2. The optical coupling unit according to claim 1, in which said second gate circuit outputs to said first optical transmission means said second electrical signal output from said second optical receiving means when a signal level of said fourteenth optical signal received by said second optical receiving means is below a predetermined level, and said third gate circuit outputs to said second optical transmission means said first electrical signal output from said first optical receiving means when a signal level of said twelfth optical signal received by said first optical receiving means is below a predetermined level.

3. The optical coupling unit according to claim 2, in which said first gate circuit is an OR gate.

* * * * *